United States Patent
Wang et al.

[11] Patent Number: 5,905,837
[45] Date of Patent: May 18, 1999

[54] SIDE EMITTING OPTICAL FIBER

[75] Inventors: Ting Wang, Princeton; Kojiro Watanabe, Princeton Jct., both of N.J.

[73] Assignee: NEC USA, Inc., Princeton, N.J.

[21] Appl. No.: 08/898,665

[22] Filed: Jul. 22, 1997

[51] Int. Cl.$^6$ ..................................................... G02B 6/02
[52] U.S. Cl. ........................... 385/123; 385/127; 385/124
[58] Field of Search ............................... 385/123, 31, 124, 385/36, 43, 127, 128, 147; 65/385, 435

[56] References Cited

U.S. PATENT DOCUMENTS 5,729,645  3/1998  Garito et al. ............................. 385/127

*Primary Examiner*—Phan Palmer
*Attorney, Agent, or Firm*—Sughrue, Mion, Zinn, Macpeak & Seas, PLLC

[57] ABSTRACT

An optical fiber that controllably taps and distributes light propagating through an the optical fiber that comprises an optical fiber having multiple regions each having a different index of refraction from one another such that when light traverses the optical fiber along a length it travels from a region of one index of refraction to another region having a different index of refraction the light is sufficiently deflected such that it is distributed out a side of the optical fiber along its length. In a preferred embodiment, at point in the length of the fiber where a change in index of refraction occurs, light traversing the fiber is efficiently diverted out of the optical fiber through the side of the fiber. The light so diverted alternatively is refracted by one or more refractive regions, and alternatively focused by prism films applied to the exit side of the fiber where it may then be put to an advantageous use.

14 Claims, 10 Drawing Sheets

SIDE EMITTING OPTICAL FIBER

FIELD OF THE INVENTION

The invention relates generally to the field of photonics, and in particular to an optical fiber for distributing and emitting light conducted through an optical fiber.

BACKGROUND OF THE INVENTION

Systems incorporating optical fibers are well known and find an ever-increasing variety of applications. Such systems include optical fiber communications systems, medical instruments, copiers, printers, facsimile machines, scanners, optical displays and lighting.

Contemporaneously with the increased use of systems utilizing optical fibers, polymer optical fiber (POF) is being recognized as a cost-effective alternative to conventional glass optical fiber for many of the above-mentioned applications. See for example, F. Suzuki, "Novel Plastic image transmission fiber," Proc. SPIE, 1592, 112–132, (1991); G. Brun, C. Farget, M. Reglat, M. Druetta, J. P. Goure, and J. P. Montheard, "Plastic optical fiber for lateral illumination: chemical studies and optical measurements," in Proc. $4^{th}$ International Conf. Plastic Optical Fibers & Applications, Boston, MA, Oct. 17–19, 1995, pp. 187–192; J. Farenc, and P. Destruel, "Illumination, signalisation, and decoration using plastic optical fibers," in Proc. 4th International Conf. Plastic Optical Fibers & Applications, Boston, MA, Oct. 17–19, 1995, pp.203–205; S. Sottini, D. Grando, L. Palchetti, and E. Giorgetti, "Optical fiber-polymer guide coupling by a tapered graded index glass guide," IEEE J. of Quantum Electronics, 31, 174–180 (1995). Among the most frequently cited advantages of using a POF are its fundamental low weight, flexibility, resistance to breaking, low material and connection cost, and immunity to electromagnetic interference.

In many of the applications employing optical fibers, polymer or otherwise, small amounts of light traversing the fiber need to be tapped and subsequently emitted from the fiber. Consequently, a number of prior art methods have been developed for causing optical fibers to emit light from the fiber.

U.S. Pat. No. 4,466,697 discloses a light dispersive optical lightpipe and method of making same. The optical lightpipes are doped in a core region with refractive and/or reflective light scattering particles. When light traversing the lightpipe strikes a particle, it is scattered and some of the scattered light exits the lightpipe through a side. As disclosed in this patent, the light scattering particles are preferably incorporated into the lightpipe during manufacture, by adding light scattering material with the molten core before extruding the material as an optical fiber.

U.S. Pat. No. 5,037,172 discloses a method of manufacturing a reflective notch coupler for an optical fiber. The coupler is formed in an optical fiber by a pair of angled surfaces extending from the cladding of the optical fiber and meeting in the fiber's core to form an indentation in the fiber. One surface of the fiber is reflectively coated and couples light into and out of the core of the optical fiber.

U.S. Pat. No. 5,432,876 discloses an illumination device and optical fibers for use within the illumination device. According to the patentees, an optical fiber is provided with a light emitting region along at least a portion of its length. In the light emitting region, there are constructed a number of optical elements which include reflecting surfaces, at least one of which has a cross sectional area less than that of the fiber. Light traversing the fiber which strikes the reflecting surface is reflected out of the fiber. In order to maintain a substantially uniform output illumination along the light emitting region of the fiber, the morphology, pattern and spacing of the optical elements are varied as desired.

Finally, U.S. patent application Ser. No. 08/667,164 and a subsequent article entitled "Distribution of Light Power and Optical Signals Using Embedded Mirrors Inside Polymer Optical Fibers" by Y. Li and T. Wang (the inventor of the present application), which appeared in IEEE Photonics Technology Letters in October, 1996, there is shown how light may be distributed through side-emitting ports along a polymer optical fiber. The ports include an imbedded mirror region, which is produced by cutting and refilling a portion of the optical fiber.

While these prior-art techniques and devices exist for tapping a light signal conducted by an optical fiber, a continuing need exists for methods and devices which tap and control the emission of light from an optical fiber.

SUMMARY OF THE INVENTION

The present invention controllably taps and distributes light propagating through an optical fiber. The invention comprises an optical fiber having multiple regions each having a different index of refraction from one another such that when light traverses the optical fiber along a length it travels from a region of one index of refraction to another region having a different index of refraction and is sufficiently deflected such that it is distributed out a side of the optical fiber along its length.

Viewed from one aspect, the present invention is directed to an optical fiber for dispersing light conducted through the fiber. More specifically, at a point in the fiber where a change in index of refraction occurs, light traversing the fiber is efficiently diverted out of the optical fiber through the side of the fiber. The light so diverted alternatively is refracted by one or more refractive regions, and alternatively focused by prism films applied to the exit side of the fiber where it may then be put to an advantageous use.

BRIEF DESCRIPTION OF THE DRAWING

To facilitate reader understanding, identical reference numerals are used to denote identical or similar elements that are common to the figures. The drawings are not necessarily to scale.

DETAILED DESCRIPTION

A preferred embodiment of the invention will now be described while referring to the figures, several of which may be simultaneously referred to during the course of the following description.

The principles of the present invention will produce an optical fiber having a variable index of refraction along a central length of the fiber. Advantageously, this produces an optical fiber which causes the emission of light along its length.

Figure 1:
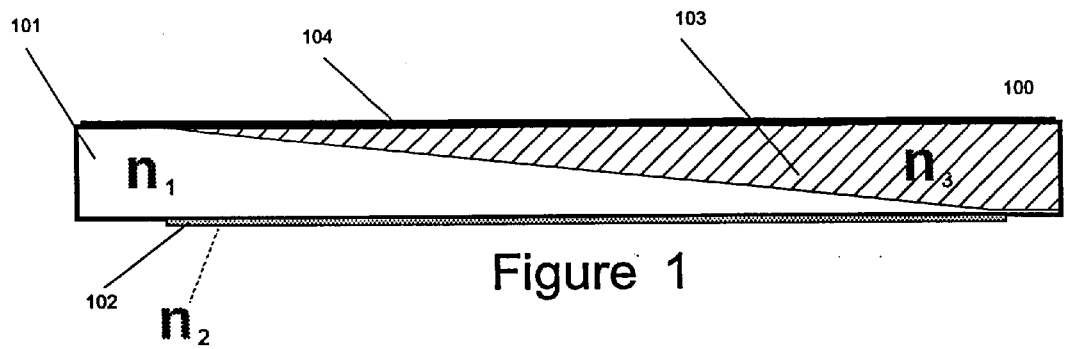
FIG. 1 is a longitudinal cross sectional view of a step-index optical fiber according to the present invention having a linear index profile change.

Referring now to FIG. 1, there is shown a longitudinal, cross sectional view of an optical fiber in accordance with a preferred embodiment of the present invention. Optical fiber 100, which is well known in the art and may be constructed from a variety of known glass, polymeric or other materials. As shown in this Figure, the optical fiber 100 has disposed on an outer surface a reflective coating 104 and a refractive coating 102 disposed on a surface of the fiber generally opposite to the reflective coating 104. Additionally, the optical fiber has at least two regions of different refractive index shown in the Figure as region 101 having an index of refraction $n_1$ and region 103 having an index of refraction $n_3$. Additionally, and as depicted in the Figure, the interface which is formed between the two regions 101 and 103 may be substantially diagonal in shape.

Consequently, light traversing the optical fiber will be deflected upon passing from one of the two regions to another due to the difference in index of refraction. For example, light traversing a length of the optical fiber through region 101 and into region 103 will be deflected out a side of the optical fiber having coating 102. Advantageously, this permits the light traversing the optical fiber to be deflected, or emitted from a side of the fiber.

Figure 1A:
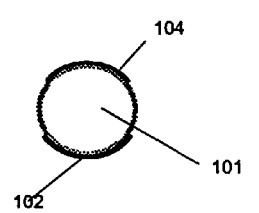
FIG. 1(a) is a cross sectional view of the step-index optical fiber of FIG. 1 viewed from one end of the optical fiber.
Figure 1B:
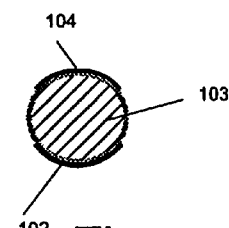
FIG. 1(b) is a cross sectional view of the step-index optical fiber of FIG. 1 viewed from another end of the optical fiber.

With reference now to FIG. 1(a), there it shows a cross sectional view of the optical fiber of FIG. 1 along end containing region 101. Specifically, region 101 is shown exhibiting a single refractive index throughout the cross sectional diameter of the fiber (ignoring any cladding). Also shown is reflective coating 104 and refractive coating 102. Similarly, FIG. 1(b) shows a cross sectional view of the optical fiber of FIG. 1 along end containing region 103. As with the other cross sectional view, region 103 is shown exhibiting a single refractive index throughout the cross sectional diameter of the fiber. Reflective coating 104 and reflective coating 102 are shown along the opposite, outermost radius of the fiber.

Figure 2:
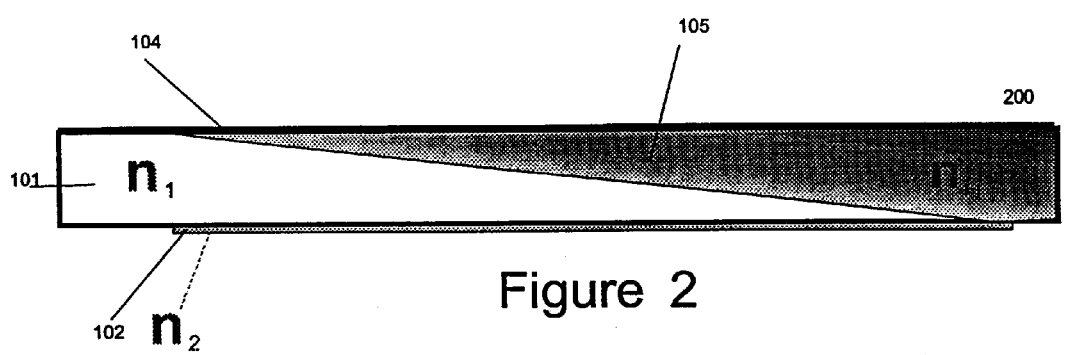
FIG. 2 is a longitudinal cross sectional view of an optical fiber according to the present invention having a gradient index profile change.

With reference now to FIG. 2, there is shown a longitudinal, cross sectional view of an optical fiber in accordance with an additional embodiment of the present invention. As shown in this Figure, the optical fiber 200 has disposed on an outer surface a reflective coating 104 and a refractive coating 102 disposed on a surface of the fiber generally opposite to the reflective coating 104. Additionally, the optical fiber has at least two regions of different refractive index shown in the Figure as region 101 having an index of refraction $n_1$ and region 105 having a gradient index of refraction $n_{i-j}$. Additionally, and as was the case with the earlier shown embodiment, the interface which is formed between the two regions 101 and 105 is substantially diagonal in shape.

Consequently, and in a manner similar to that described previously, light traversing the optical fiber will be deflected upon passing from one of the two regions to another due to the difference in index of refraction. For example, light traversing a length of the optical fiber through region 101 and into region 105 will be deflected out a side of the optical fiber having coating 102. Advantageously, this permits the light traversing the optical fiber to be deflected, or emitted from a side of the fiber.

As can be readily appreciated, the index of refraction of the gradient region is shown to be $n_{i-j}$ which is advantageously a function of the diameter and emitting area (length) of the fiber over which the light emission occurs. Specifically, $$Index\ n_{i-j}=f(d,l)$$

where d=diameter of the fiber, and l=emitting area (length).

Figure 2A:
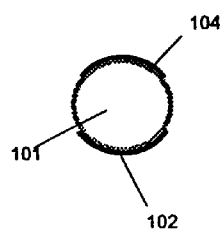
FIG. 2(a) is a cross sectional view of the optical fiber of FIG. 2 viewed from one end of the optical fiber.
Figure 2B:
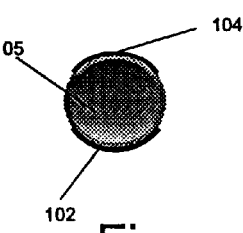
FIG. 2(b) is a cross sectional view of the optical fiber of FIG. 2 viewed from another end of the optical fiber.

With reference now to FIG. 2(a), there it shows a cross sectional view of the optical fiber of FIG. 1 along end containing region 101. Specifically, region 101 is shown exhibiting a single refractive index throughout the cross sectional diameter of the fiber (ignoring any cladding). Also shown is reflective coating 104 and refractive coating 102. Similarly, FIG. 2(b) shows a cross sectional view of the optical fiber of FIG. 1 along end containing region 105. In this cross sectional view however, region 105 is shown exhibiting a single refractive index substantially throughout the cross sectional diameter of the fiber. Reflective coating 104 and reflective coating 102 are shown along the opposite, outermost radius of the fiber.

Figure 3:
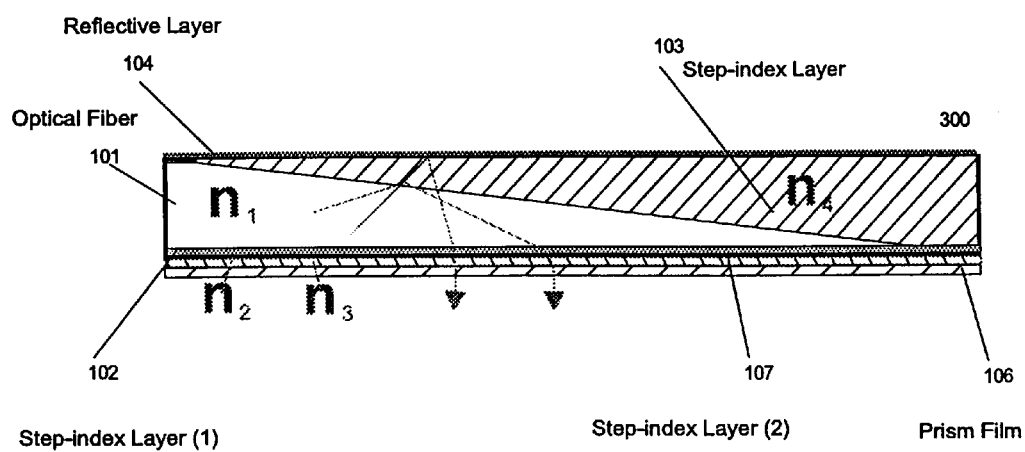
FIG. 3 is a longitudinal cross sectional view of a side emitting fiber according to the present invention illustrating ray tracing within the fiber.

Turning our attention now to FIG. 3, there it shows an additional embodiment of the present invention. As shown in this Figure, the optical fiber 300 has disposed on an outer surface a reflective coating 104 and a step index, or refractive coating 102 disposed on a surface of the fiber generally opposite to the reflective coating 104. Further, the optical fiber has disposed on the step index layer 102 having an index of refraction $n_2$, a second step index layer 107 having an index of refraction $n_3$, and a prism film layer 106 disposed on the second step index layer 107. Additionally, the optical fiber has at least two regions within its core of different refractive index shown in the Figure as region 101 having an index of refraction $n_1$ and region 103 having a step index of refraction $n_4$. As was the case with the earlier shown embodiment, the interface which is formed between the two regions 101 and 103 is substantially diagonal in shape.

Figure 5:
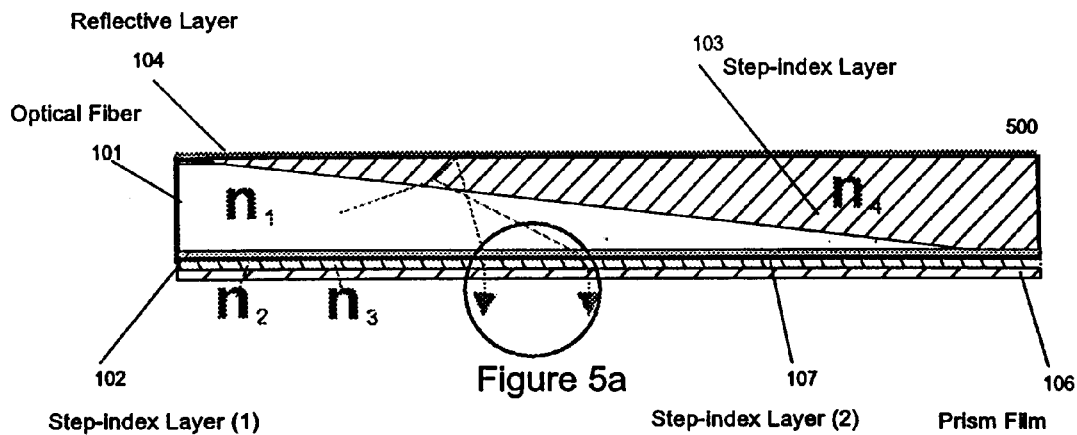
FIG. 5 is a longitudinal cross sectional view of a step index optical fiber according to the present invention illustrating ray tracing within the fiber.
Figure 5A:
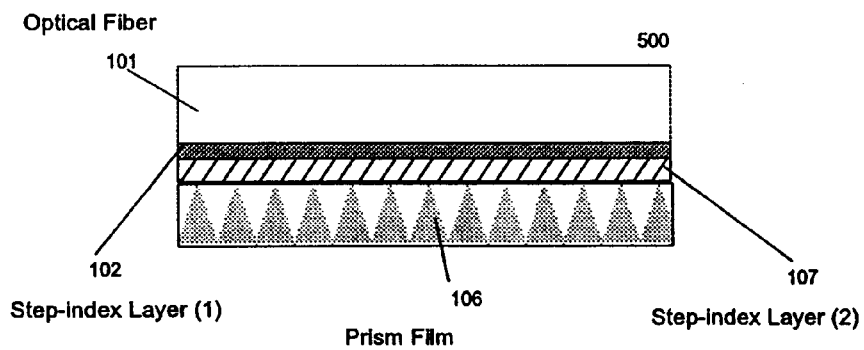
FIG. 5(a) is a longitudinal cross sectional, exploded view of the fiber of FIG. 5.

As those skilled in the art will readily appreciate from observing this Figure, light traversing the fiber from region 101 into region 103, will be deflected out the side of the fiber having, the multiple, layered coatings 102, 107, and 106. Advantageously, the multiple coatings further deflect the light such that it may be precisely emitted and/or focused through the effect of the multiple step index layers 102 and 107 and the prism film layer 106. An additional drawing of this embodiment is shown in FIG. 5. FIG. 5(a) is an exploded view showing the optical fiber 500 with region 101 and step index layer 1 102, step index layer 2 107 and prism film layer 106 applied to a side of the fiber.

Figure 4:
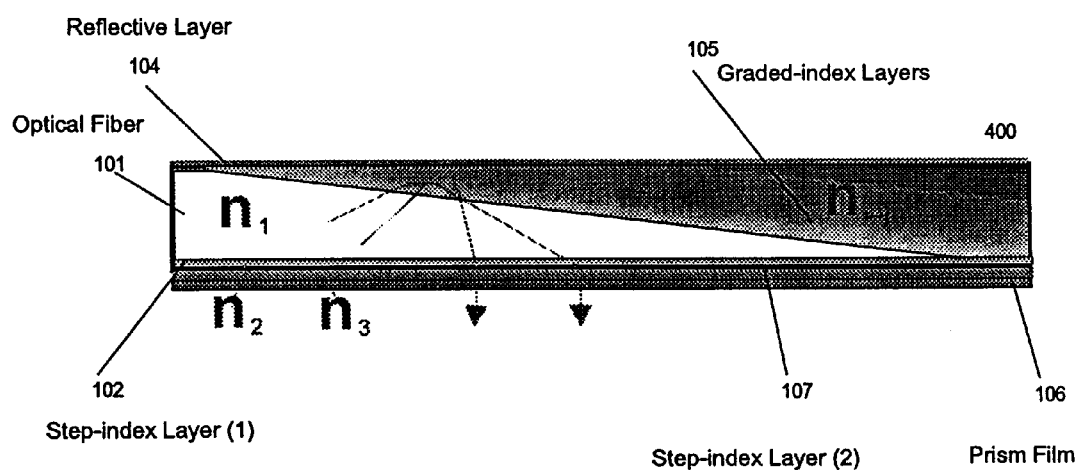
FIG. 4 is a longitudinal cross sectional view of an optical fiber according to the present invention having a gradient index profile change and illustrating ray tracing within the fiber.

Readily apparent to those skilled in the art is additional embodiment shown in FIG. 4. Specifically, optical fiber 400 is shown having at least two principle regions 101 and 105 each with a different index of refraction. As shown, region 101 exhibits an index of refraction $n_1$ while region 105 is a graded-index region, exhibiting an index of refraction $n_{i-j}$. Applied to a side of the optical fiber is reflective layer 104 which advantageously reflects light traversing the fiber to its core. Applied to a side of the fiber opposite the reflective layer 104, are step index layer 1, having an index of refraction $n_2$, step-index layer 2, having an index of refraction $n_3$, and prism film layer 106.

Figure 6:
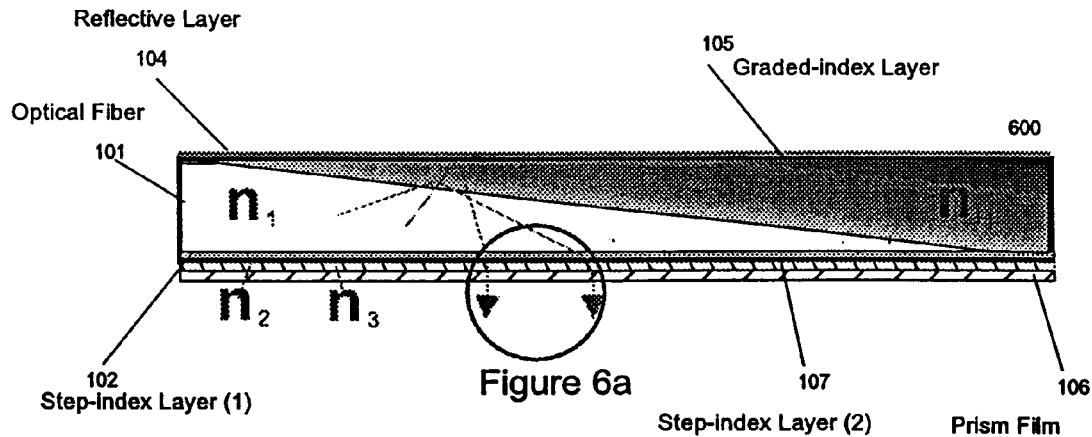
FIG. 6 is a longitudinal cross sectional view of a graded index profile optical fiber according to the present invention illustrating ray tracing within the fiber.
Figure 6A:
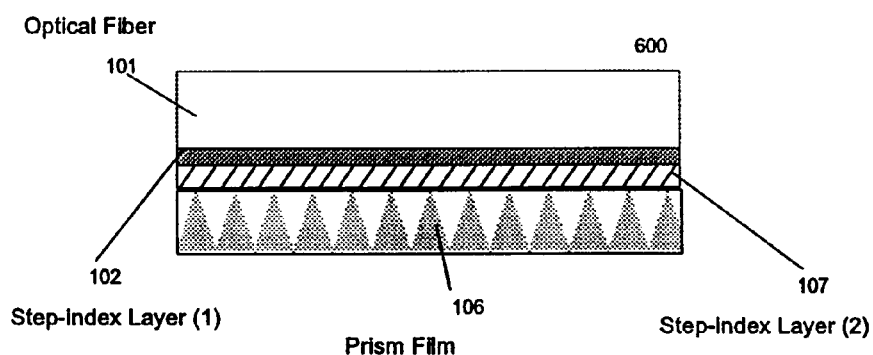
FIG. 6(a) is a longitudinal cross sectional, exploded view of the fiber of FIG. 6.

As can be appreciated, light traversing the fiber from region 101 into graded index region 105 will be deflected or bent due to the different index of refraction for the two regions. Light whose deflection angle is greater than a critical angle (the angle at which total internal reflection occurs) will either be advantageously reflected by the reflective layer 104 and then "focused" through the combined action of passing through step index layer 1, step index layer 2 and prism film layer. Other light will simply be deflected out the side of the optical fiber similarly through the combined step index layer 1, step index layer 2 and prism film layer(s). An additional drawing of this embodiment is shown in FIG. 6. FIG. 6(a) is an exploded view showing the optical fiber 600 with region 101 and step index layer 1 102, step index layer 2 107 and prism film layer 106 applied to a side of the fiber.

Figure 7:
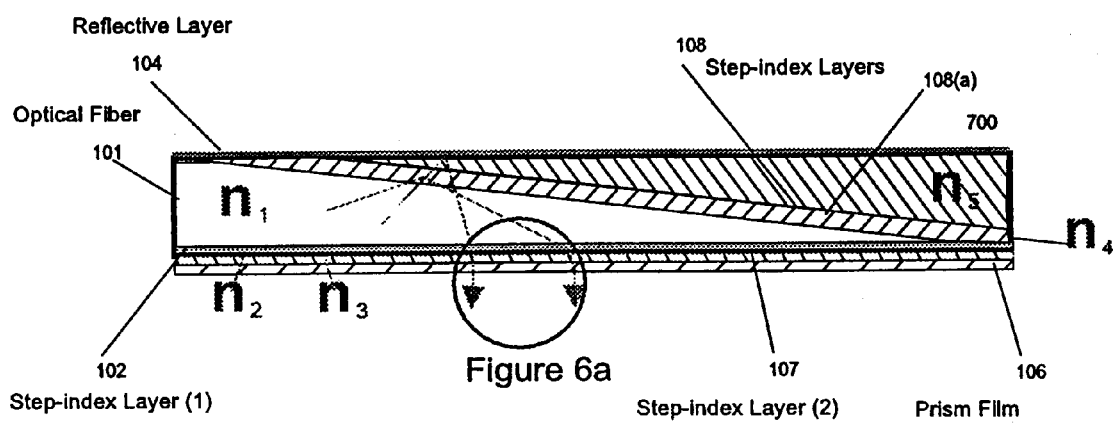
FIG. 7 is a longitudinal cross sectional view of a multi-step index optical fiber according to the present invention illustrating ray tracing within the fiber.

An additional alternative embodiment of the side emitting step index fiber shown in FIG. 3 is shown in FIG. 7. Specifically, optical fiber 700 is shown having at least three principle regions 101, 108 and 108(a) each with a different index of refraction. As shown, region 101 exhibits an index of refraction $n_1$ while region 108 is a step-index region, exhibiting an index of refraction $n_5$. Additional step index region 108(a), interposed between regions 101 and 108, exhibits an index of refraction $n_4$. Applied to a side of the optical fiber is reflective layer 104 which advantageously reflects light traversing the fiber to its core. Applied to a side of the fiber opposite the reflective layer 104, are step index layer 1, having an index of refraction $n_2$, step-index layer 2, having an index of refraction $n_3$, and prism film layer 106.

Figure 8:
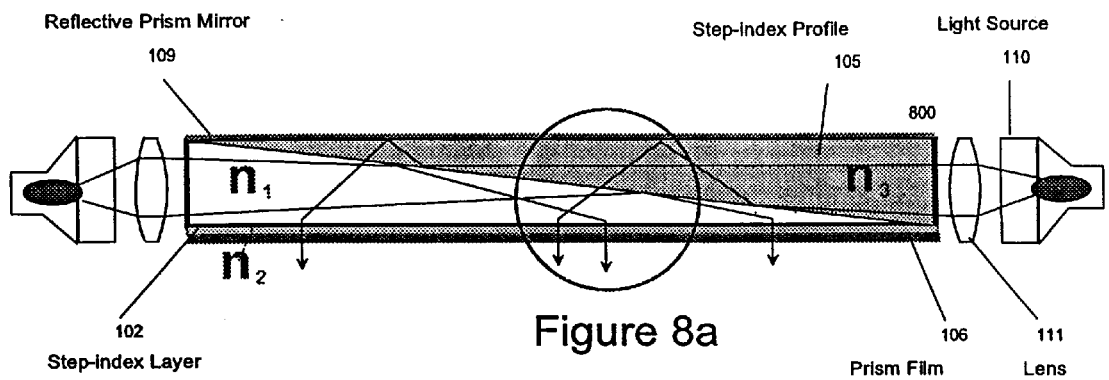
FIG. 8 is a longitudinal cross sectional view of a step-index optical fiber according to the present invention having a step index profile change and a light source for coupling light into the fiber.
Figure 8A:
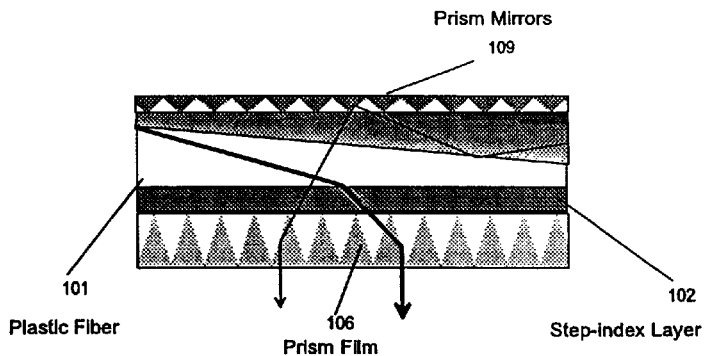
FIG. 8(a) is a longitudinal cross sectional, exploded view of the optical fiber of FIG. 8 having a prism mirror and prism film on opposite sides.

Yet another embodiment of the side emitting step index fiber shown in FIG. 3 is shown in FIG. 8. Specifically, optical fiber 800 is shown having at least two principle regions 101, 105 each with a different index of refraction. As shown, region 101 exhibits an index of refraction $n_1$ while region 105 is a step-index region, exhibiting an index of refraction $n_3$. Light sources 110, positioned at opposite ends of the optical fiber emit light which is subsequently injected into the fiber through the focusing action of lens 111 and conducted by the optical fiber. Applied to a side of the optical fiber is reflective prism layer 109 which advantageously reflects light traversing the fiber to its core. Applied to a side of the fiber opposite the reflective layer 104, are a step index layer 102, having an index of refraction $n_2$, and prism film layer 106. An exploded view of the fiber 800 is shown in FIG. 8(a).

Figure 9:
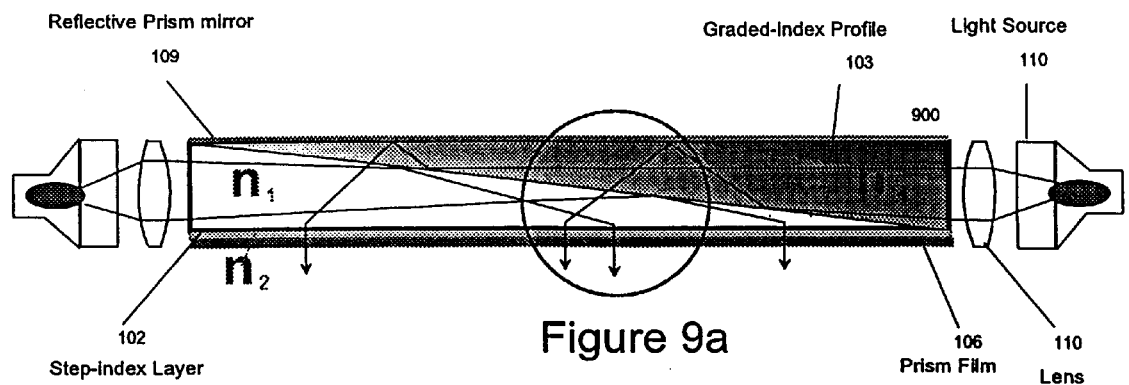
FIG. 9 is a longitudinal cross sectional view of a graded-index profile optical fiber according to the present invention having a gradient index profile change and a light source for coupling light into the fiber.
Figure 9A:
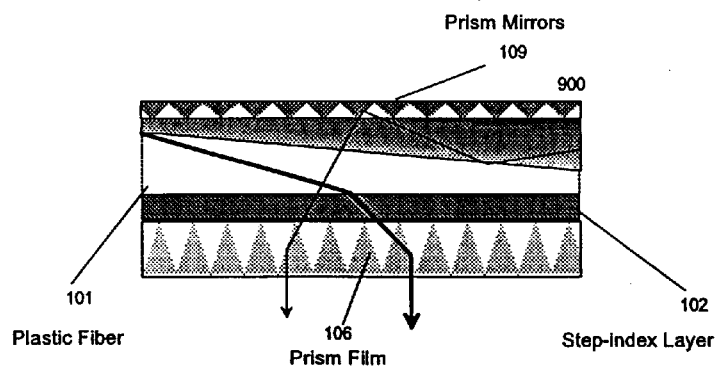
FIG. 9(a) is a is a longitudinal cross sectional, exploded view of the optical fiber of FIG. 9 having a prism mirror and prism film on opposite sides.
Figure 10:
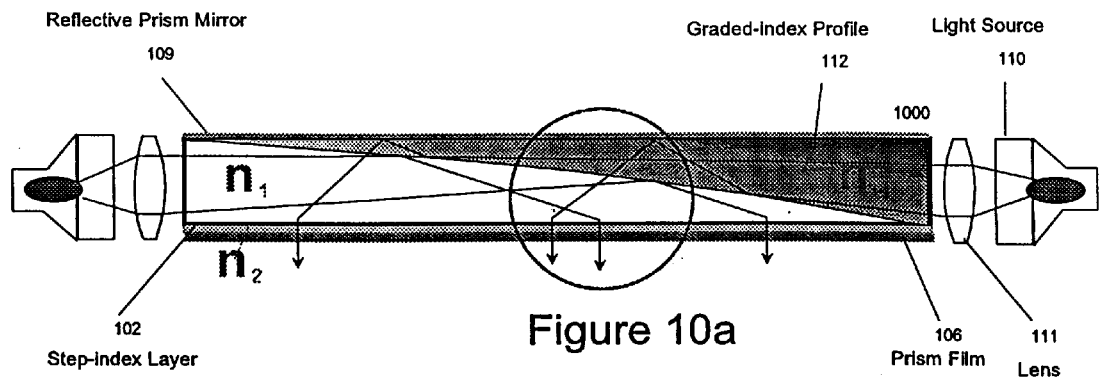
FIG. 10 is a longitudinal cross sectional view of a curved, graded-index profile optical fiber according to the present invention having a curved graded index profile change and a light source for coupling light into the fiber.
Figure 10A:
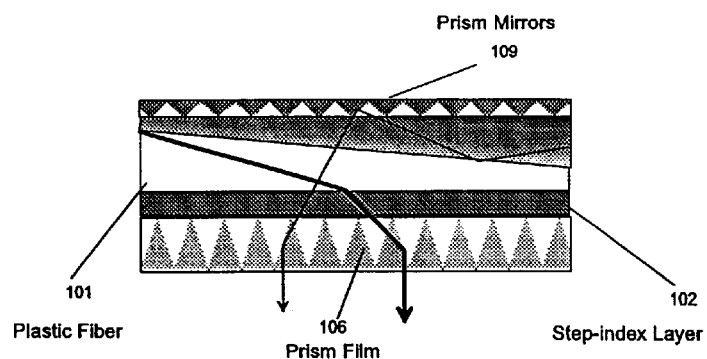
FIG. 10(a) is a is a longitudinal cross sectional, exploded view of the optical fiber of FIG. 10 having a prism mirror and prism film on opposite sides.

Similarly, an alternative embodiment of the side emitting graded index fiber shown in FIG. 4 is shown in FIG. 9. Specifically, optical fiber 900 is shown having at least two principle regions 101, 103 each with a different index of refraction. As shown, region 101 exhibits an index of refraction $n_1$ while region 103 is a graded-index region, exhibiting an index of refraction $n_{i-j}$. Light sources 110, positioned at opposite ends of the optical fiber emit light which is subsequently injected into the fiber through the focusing action of lens 111 and conducted by the optical fiber. Applied to a side of the optical fiber is reflective prism mirror layer 109 which advantageously reflects light traversing the fiber to its core. Applied to a side of the fiber opposite the reflective layer 104, are a step index layer 102, having an index of refraction $n_2$, and prism film layer 106. An exploded view of the fiber 900 is shown in FIG. 9(a). While this Figure depicts plastic or polymer optical fiber (POF), those skilled in the art will of course appreciate that any suitable material, i.e., glass or composite may be used as well.

While a number of index profile characteristics are possible for fibers of the present invention, the following mathematical descriptions are useful.

$$N_1(l) = al + b \qquad (1)$$

$$N_2(l) = a^l + b \qquad (2)$$

$$N_3(l) = n_0\left(1 - \frac{A}{2}l^2\right) \qquad (3)$$

where a and b are both constants. Additionally:

$$\frac{d^2h}{dl^2} = \frac{-Ah}{\left(\frac{n(h,l)}{n_0}\right)^2}\left[1 + \left(\frac{dh}{dl}\right)^2\right]^{1/2} \qquad (5)$$

$$l = 0$$
$$h = h_0$$
$$\frac{dh}{dl} = tg\beta$$
$$n_0 \sin\alpha = n(h_0, 0)\sin\beta$$

where A=wavelength function.

Figure 11:
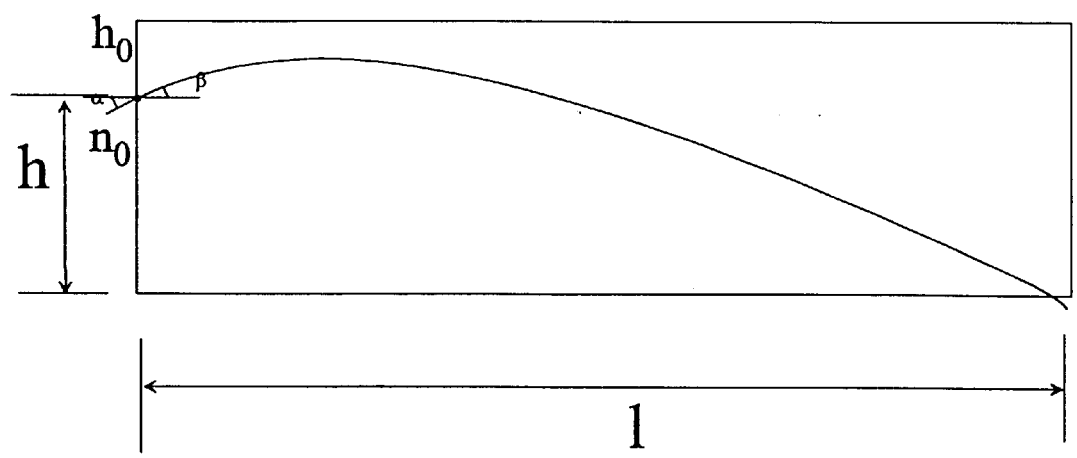
FIG. 11 is a graph representative of the ray tracing function of the optical fiber of the present invention.

FIG. 11 graphically depicts the ray tracing characteristics for an optical fiber according to the present invention.

Those skilled in the art will now readily recognize that a great variety of structures or devices may be utilized as light shutters dispersive elements to control the properties of the emitted light, e.g., brightness, color, polarization, etc. Such devices include, but are not limited to, thermal, mechanical, chemical, electrochemical and electrical modification of materials, either temporary or permanent, that alter the optical properties of the optical fiber, the refilled portion or both.

Materials used as dispersive elements or shutters may be broadly classified as reflective or transmissive elements. Examples of the latter include index-matching or index contrasting material used to fill the cut and refilled region. As those skilled in the art can appreciate, the light which encounters either the light dispersive elements or the light shutters may have its amplitude, phase, or polarization changed due to the interaction with the particular element.

Particular materials which diffract only one specific wavelength, so that they act more like a filter than a diffraction grating are particularly attractive. Such materials include Tellurium Dioxide ($TeO_2$).

Phase-modulation of the light may be converted to amplitude-modulation by a number of means familiar to those skilled in the art so that, e.g., a physical effect providing sensitive modulation of the phase of transmitted light, but little effect on the amplitude of the transmitted light. In a similar manner, changes in the polarization of light can be translated into brightness changes through the use of fixed polarizing elements.

The physical effect affecting material optical properties, and which may be used to control or modulate the emission of light from the side emitting optical fiber includes, but is not limited to electrical or magnetic modulation of the refractive index, polarization, and absorption. Optical modulation may also be used to control these parameters including, optical modulation of the refractive index or absorption through the photochromic effect.

The optical properties may also be controlled by mechanical effect such as "elasto-optical" effects, due to variation of the mechanical strain in the element, or due to scattering of density modulation in the material as well as thermal effects. The reflection-coefficient of reflective elements may be modified by any of these means and in addition, in some materials it is possible to switch the material from a reflective state to a non-reflective state. All such effects may occur in both crystalline as well as glassy or polymeric materials.

Further, the optical characteristics of the elements may be modulated by chemical or electrochemical means, which may or may not produce a permanent or irreversible chemical change in the material comprising the element, as for instance, a pH change to change the color of an indicator dye.

As should now be readily apparent, a useful application of the present invention is to deliver selectively, light to different locations along the length of the optical fiber, i.e., the delivery of computer, clock, or data signals, or alternatively, in the construction of other light emitting devices.

Clearly, it should now be quite evident to those skilled in the art, that while the invention was shown and described in detail in the context of a preferred embodiment, and with various modifications thereto, a wide variety of other modifications can be made without departing from scope of the inventive teachings. Therefore the invention should only be limited by the following claims.

What is claimed is:

1. A side emitting optical fiber for distributing and emitting light along a length of the optical fiber, said optical fiber comprising:
   a substantially cylindrical elongated core with a central axis and a cladding on an outside portion of the core, said core including:
   a first transmissive region having an index of refraction n throughout an entire cross sectional area of the core;
   a second transmissive region having a step index of refraction throughout an entire cross sectional area of the core; and
   an interface region formed by the contact of the first transmissive region with the second transmissive region characterized in that the index of refraction for the interface region across the cross sectional area of the core transitions in a prescribed tanner from being entirely $n_1$ to being entirely $n_2$;
   wherein light rays traversing the fiber are deflected out a desired length of the side of the fiber when passing from the first transmissive region through the interface region.

2. The side emitting optical fiber according to claim 1 further comprising a reflective layer applied to a side of the optical fiber opposite the side through which the deflected light is emitted.

3. The side emitting optical fiber according to claim 2 further comprising a first step index layer applied to the side of the fiber through which the deflected light is emitted and having an index of refraction $n_3$; that differs from the index of refraction of the first transmissive region and the second transmissive region.

4. The side emitting optical fiber according to claim 3 further comprising a second step index layer applied to the first step index layer and having an index of refraction $n_4$.

5. The side emitting optical fiber according to claim 4 further comprising a prism film layer, applied to the second step index layer.

6. The side emitting optical fiber according to claim 1 wherein said interface region further comprises a transmissive region having an index of refraction $n_5$ that differs from the index of refraction of the first transmissive region and the index of refraction of the second transmissive region.

7. A side emitting optical fiber for distributing and emitting light along a length of the optical fiber, said optical fiber comprising:
   a substantially cylindrical elongated core with a central axis and a cladding on an outside portion of the core, said core including:
   a first transmissive region having an index of refraction $n_1$ throughout an entire cross sectional area of the core;
   a second transmissive region having a gradient index of refraction $n_{i-j}$ throughout an entire cross sectional area of the core; and
   an interface region formed by the contact of the first transmissive region with the second transmissive region characterized in that the index of refraction for the interface region across the cross sectional area of the core transitions in a prescribed manner from being entirely $n_1$ to being entirely $n_{i-j}$;
   wherein light rays traversing the fiber are deflected out a desired length of the side of the fiber when passing from the first transmissive region through the interface region.

8. The side emitting optical fiber according to claim 7 further comprising a reflective layer applied to a side of the optical fiber opposite the side through which the deflected light is emitted.

9. The side emitting optical fiber according to claim 8 further comprising a first step index layer applied to the side of the fiber through which the deflected light is emitted and having an index of refraction $n_3$; that differs from the index of refraction of the first transmissive region and the second transmissive region.

10. The side emitting optical fiber according to claim 9 further comprising a second step index layer applied to the first step index layer and having an index of refraction $n_4$.

11. The side emitting optical fiber according to claim 10 further comprising a prism film layer, applied to the second step index layer.

12. The side emitting optical fiber according to claim 7 wherein said interface region further comprises a transmissive region having an index of refraction $n_5$ that differs from the index of refraction of the first transmissive region and the index of refraction of the second transmissive region.

13. The side emitting optical fiber according to claim 7 wherein the index of refraction of the second transmissive region is a function of a diameter of the optical fiber and a length of the emitting area through which light emission occurs and is represented by $$\text{Index } n_{i-j} = f(d,l)$$

where
    d=diameter of the fiber, and
    l=emitting area (length) of the fiber.

14. The side emitting optical fiber according to claim 7 wherein the index of refraction of the second transmissive region is given by:

$$N_1(l) = al + b;$$

and $$N_2(l) = a^l + b;$$

where a and b are both constants and $$\frac{d^2h}{dl^2} = \frac{-Ah}{\left(\frac{n(h,l)}{n_0}\right)^2}\left[1 + \left(\frac{dh}{dl}\right)^2\right]^{1/2}; \text{ where}$$

$$l = 0$$
$$h = h_0$$
$$\frac{dh}{dl} = tg\beta$$

and $$n_0 \sin\alpha = n(h_0, 0)\sin\beta;$$

where A=wavelength function.

* * * * *

UNITED STATES PATENT AND TRADEMARK OFFICE
CERTIFICATE OF CORRECTION

PATENT NO.   : 5,905,837
DATED        : May 18, 1999
INVENTOR(S)  : Ting WANG and Kojiro WATANABE It is certified that error appears in the above-identified patent and that said Letters Patent is hereby corrected as shown below:

Column, 8, line 2, delete "n" and insert --$n_1$--;

Column 8, line 5, after "refraction" insert --$n_2$--; and

Column 8, line 11, delete "tanner" and insert --manner--.

Signed and Sealed this

Twenty-eighth Day of December, 1999

Attest:

Q. TODD DICKINSON

Attesting Officer    Acting Commissioner of Patents and Trademarks